US011710333B2

(12) United States Patent
Sodeura

(10) Patent No.: US 11,710,333 B2
(45) Date of Patent: Jul. 25, 2023

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Minoru Sodeura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 450 days.

(21) Appl. No.: 16/935,219

(22) Filed: Jul. 22, 2020

(65) Prior Publication Data

US 2021/0248366 A1  Aug. 12, 2021

(30) Foreign Application Priority Data

Feb. 10, 2020 (JP) .................................. 2020-020734

(51) Int. Cl.
 G06V 30/416 (2022.01)
 G06V 30/414 (2022.01)
 G06V 30/148 (2022.01)
 G06V 10/44 (2022.01)
 G06V 10/22 (2022.01)

(52) U.S. Cl.
 CPC ............ G06V 30/416 (2022.01); G06V 10/22 (2022.01); G06V 10/44 (2022.01); G06V 30/153 (2022.01); G06V 30/414 (2022.01)

(58) Field of Classification Search
 CPC .. G06V 30/153; G06V 30/414; G06V 30/416; G06V 30/1448; G06V 10/25
 See application file for complete search history.

(56) References Cited

U.S. PATENT DOCUMENTS

| 7,930,627 | B2* | 4/2011 | Ming ................... H04N 1/3876 |
| | | | 715/229 |
| 2003/0059098 | A1* | 3/2003 | Jones ................. G06Q 30/0185 |
| | | | 382/135 |
| 2019/0124227 | A1 | 4/2019 | Tabata |
| 2021/0203805 | A1* | 7/2021 | Fuse .................... H04N 1/3871 |
| 2021/0349113 | A1* | 11/2021 | Watanabe ......... G01N 35/00712 |

FOREIGN PATENT DOCUMENTS

JP   2019080166   5/2019

* cited by examiner

*Primary Examiner* — Daniel G Mariam
(74) *Attorney, Agent, or Firm* — JCIPRNET

(57) ABSTRACT

An information processing apparatus includes a processor configured to receive an input image including images of plural documents, execute detection of one or more items determined in advance as an item included in the document from the input image, and execute output processing of extracting and outputting the image of each document from the input image based on the detected one or more items.

14 Claims, 19 Drawing Sheets

FIG. 2 RELATED ART
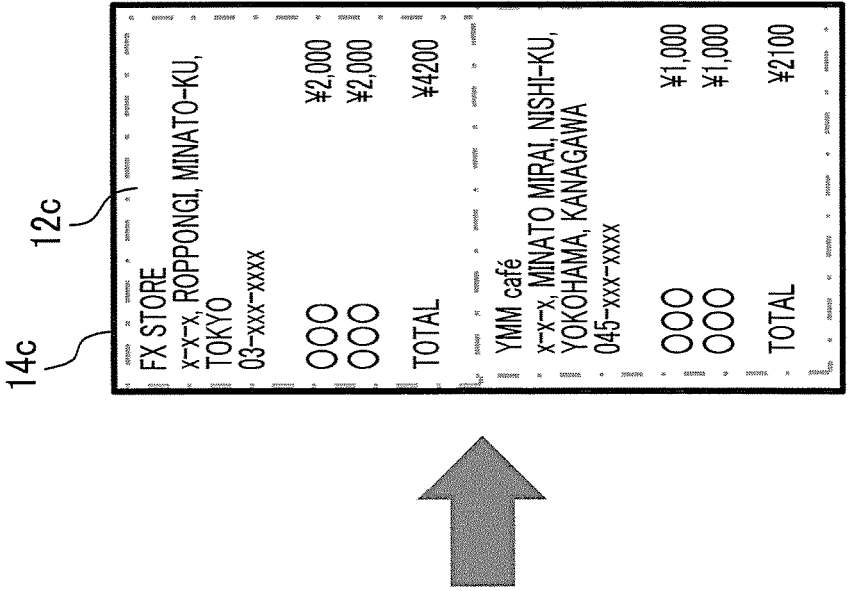
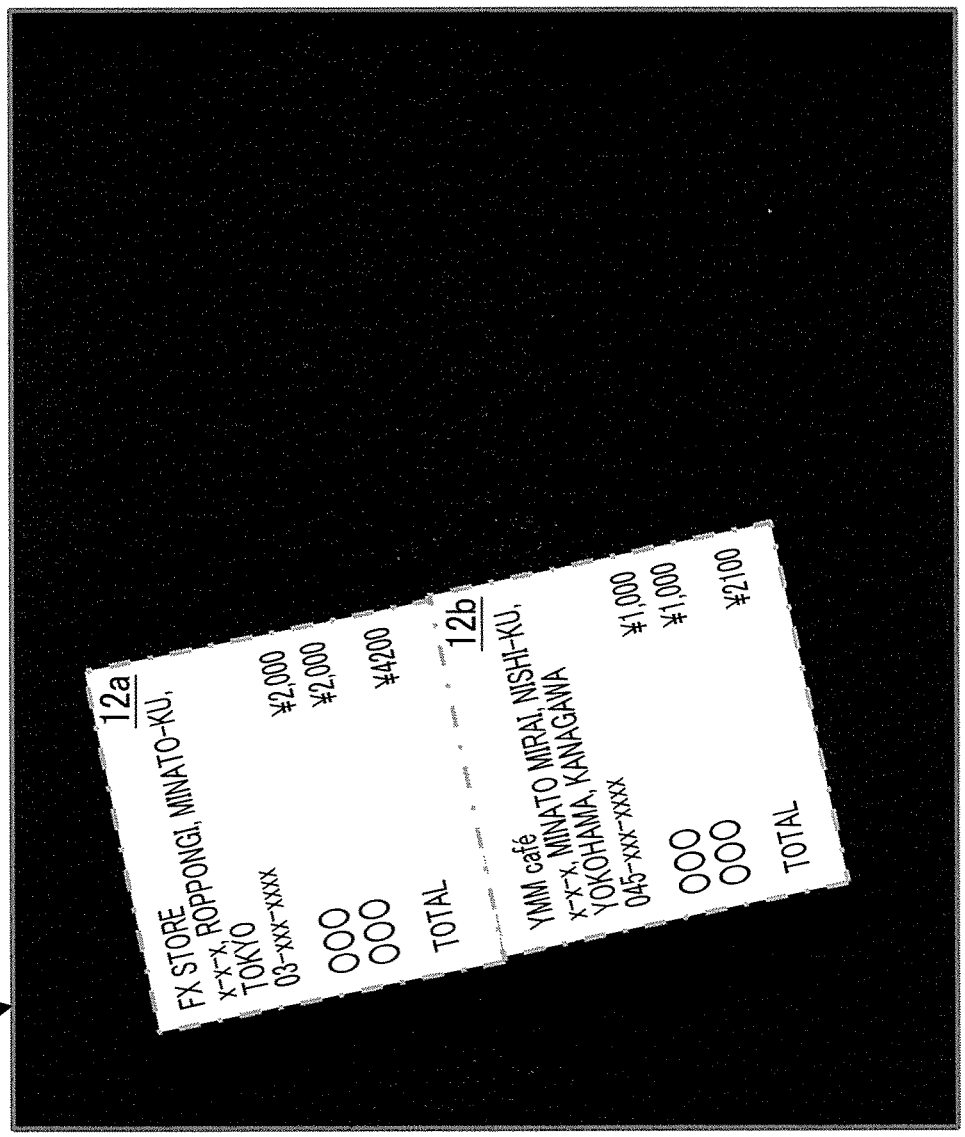

FIG. 6

| ITEM ID | DETECTED FLAG | SPECIFIC ITEM | DETERMINATION CONDITION |
|---|---|---|---|
| COMPANY NAME | OFF | COMPANY NAME | · COMPANY AND ORGANIZATION NAME DATABASE IS PREPARED.<br>· "CORPORATION", "(CORP.)" IS INCLUDED.<br>............. |
| NAME | OFF | NAME | FIRST PORTION OF TEXT STRING IS INCLUDED IN FAMILY NAME DATABASE AND ONE OR MORE TEXTS AFTER FIRST PORTION OF TEXT STRING ARE PRESENT. |
| ADDRESS | OFF | ADDRESS | · ADDRESS NOTATION FORMAT IS SATISFIED. |
| CONTACT INFORMATION | OFF | TELEPHONE NUMBER | TELEPHONE NUMBER NOTATION FORMAT IS SATISFIED. |
| | | MAIL ADDRESS | MAIL ADDRESS NOTATION FORMAT IS SATISFIED. |

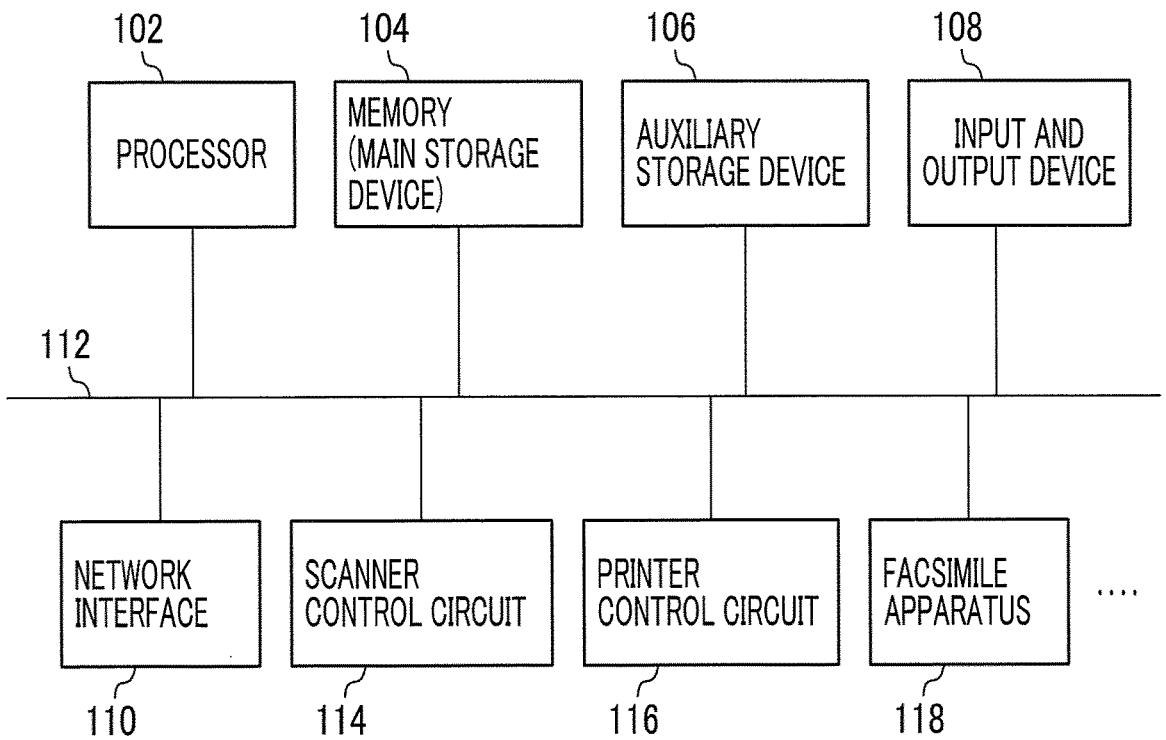

FIG. 7

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-020734 filed Feb. 10, 2020.

BACKGROUND

(i) Technical Field

The present invention relates to an information processing apparatus and a non-transitory computer readable medium storing a program.

(ii) Related Art

Some scanner apparatuses and multi-function machines (that is, apparatuses having functions of a scanner, a printer, and copying machine) may have a function of reading a plurality of documents placed on a document stand called a platen, cropping images of individual documents from the read image, and converting the images into data. Such a function is called a multi-crop function.

In the apparatus of the related art, accuracy of cropping the images of individual documents is improved by increasing contrast between a peripheral portion of the document and a background by a method of covering the plurality of documents placed on the document stand with a black background sheet.

However, an operation of covering a document group with the black background sheet is often forgotten. The multi-function machine comprises a document cover portion capable of being opened and closed with respect to the document stand (this multi-function machine includes an automatic document feeding device in many cases), and a surface of the document cover portion facing the document stand is generally in a color of white. In a case where a user forgets to cover the plurality of documents on the document stand with the black background sheet and scans the documents while closing the document cover as usual, the read image illustrates a state in which a plurality of white documents is arranged on a white background. In many cases, edges of the documents do not clearly appear in the read image. In a case where the edges of the documents are not clear, accuracy of cropping the images of the individual documents deteriorates. For example, an error such that the plurality of individual documents is cropped as one large document occurs.

Even though the cropping accuracy is increased by using the black background sheet, an error may occur in the cropping. For example, in a case where the plurality of documents is aligned and placed on the document stand in a state in which the documents are slightly overlapped with each other without a gap, the plurality of documents may be cropped as one document by the multi-crop function.

An apparatus described in JP2019-080166A acquires a region image indicating a region including a document placed in a reading region, and inverts or rotates the region image such that arrangement of document images included in the region image matches arrangement in a case where the reading region is viewed in a predetermined direction. The inverted or rotated region image is output.

SUMMARY

Aspects of non-limiting embodiments of the present disclosure relate to an information processing apparatus and a non-transitory computer readable medium storing a program that appropriately extract a document region from an input image obtained by imaging a document based on an item of the document compared to a case where the document region is not extracted from the input image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to receive an input image including images of a plurality of documents, execute detection of one or more items determined in advance as an item included in the document from the input image, and execute output processing of extracting and outputting the image of each document from the input image based on the detected one or more items.

BRIEF DESCRIPTION OF THE DRAWINGS

Exemplary embodiment(s) of the present invention will be described in detail based on the following figures, wherein:

FIG. 2 is a diagram for describing a problem of the multi-crop processing of the related art using the black background sheet;

FIG. 6 is a diagram illustrating contents of key item management information;

FIG. 7 is a diagram illustrating a hardware configuration of an information processing apparatus;

DETAILED DESCRIPTION

Multi-Crop Processing and Problems

Multi-crop processing is processing of imaging a surface on which a plurality of documents is arranged, automatically extracting images of individual documents from images obtained by the imaging, and individually generating files.

The multi-crop processing has been developed as a technology for a scan image obtained by scanning with a scanner, a copying machine, or a multi-function machine (that is, an apparatus having functions of a scanner, a printer, a copying machine, and a facsimile apparatus). Hereinafter, a scanner-only apparatus and a scanner incorporated in the copying machine and the multi-function machine are collectively referred to as a scanner. However, a technology of this exemplary embodiment to be described below can be applied not only to a scan image obtained by the scanner, but also to images captured by various imaging apparatuses (for example, smartphones and digital cameras).

An example of multi-crop processing of the related art will be described with reference to FIG. 1. In a case where the multi-crop processing is performed on a document of which a ground color is white such as a receipt or a business card, a document group placed on a platen of the scanner is scanned by being covered with a black background sheet. A scan image 10A obtained in this manner has document images 12a and 12b including text and images in the white ground within the black background. In the example of the scan image illustrated in FIG. 1, outer peripheral edges of the document images 12a and 12b are detected by edge detection which is one of well-known image processing, and thus, regions 14a and 14b of the document images 12a and 12b present within the scan image 10A can be specified.

Figure 1:
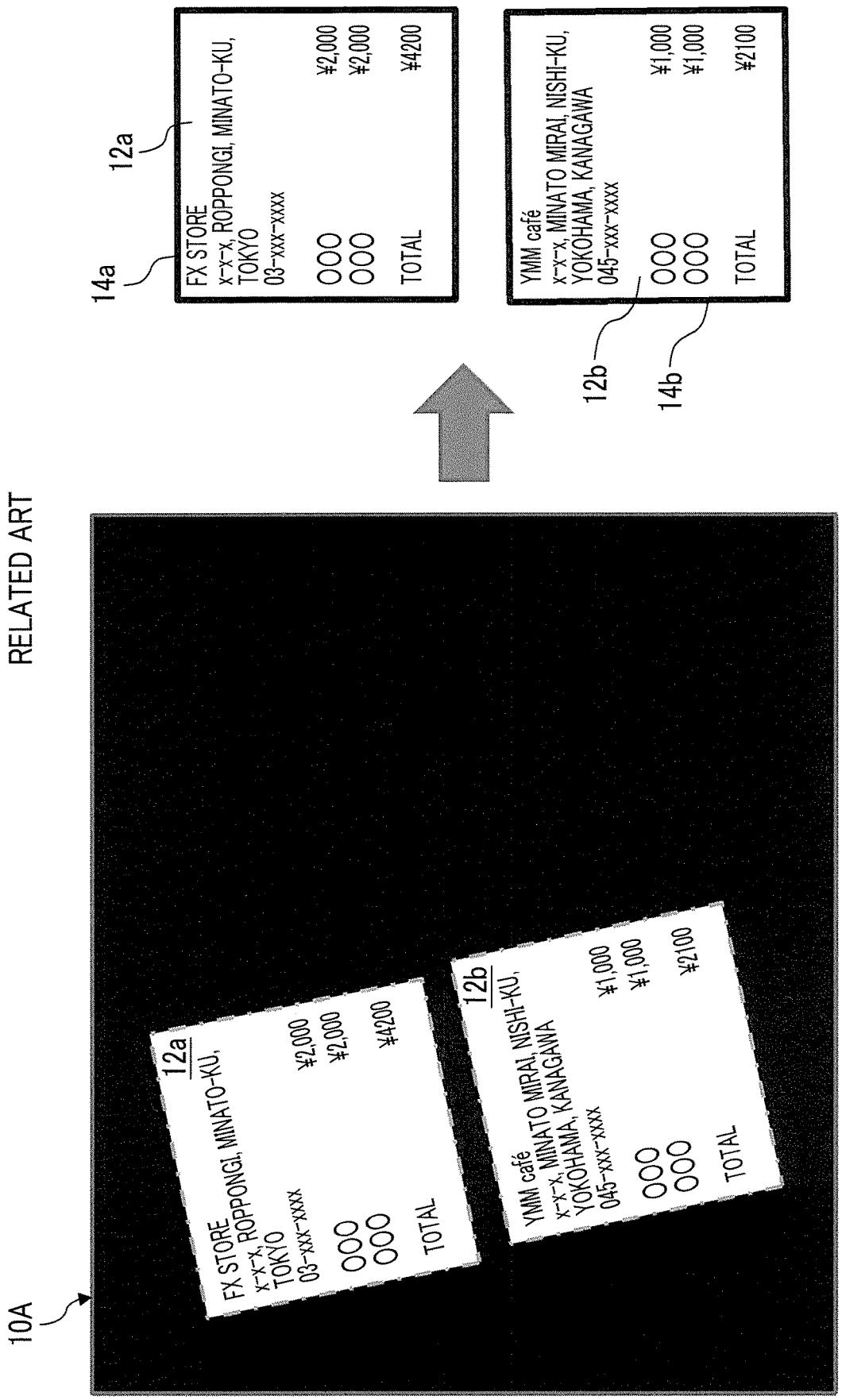
FIG. 1 is a diagram for describing multi-crop processing of the related art using a black background sheet.

FIG. 2 illustrates a scan image 10B in a case where the same two documents as the documents in the example of FIG. 1 are scanned such that both sides of the two documents are arranged on a substantially identical straight line without a gap. The two document images 12a and 12b within the scan image 10B are configured to integrally constitute one rectangle. Edges between the two images are extremely pale, and thus are not detected by the edge detection. In this case, in the multi-crop processing of the related art, one document image 12c which is an image within a smallest rectangular region 14c circumscribing the outer peripheries of the two document images 12a and 12b is extracted instead of individually extracting the two document images 12a and 12b.

The example of FIG. 2 illustrates a case where a correct document region is not extracted in a case where scanning is performed by using the black background sheet.

Figure 3:
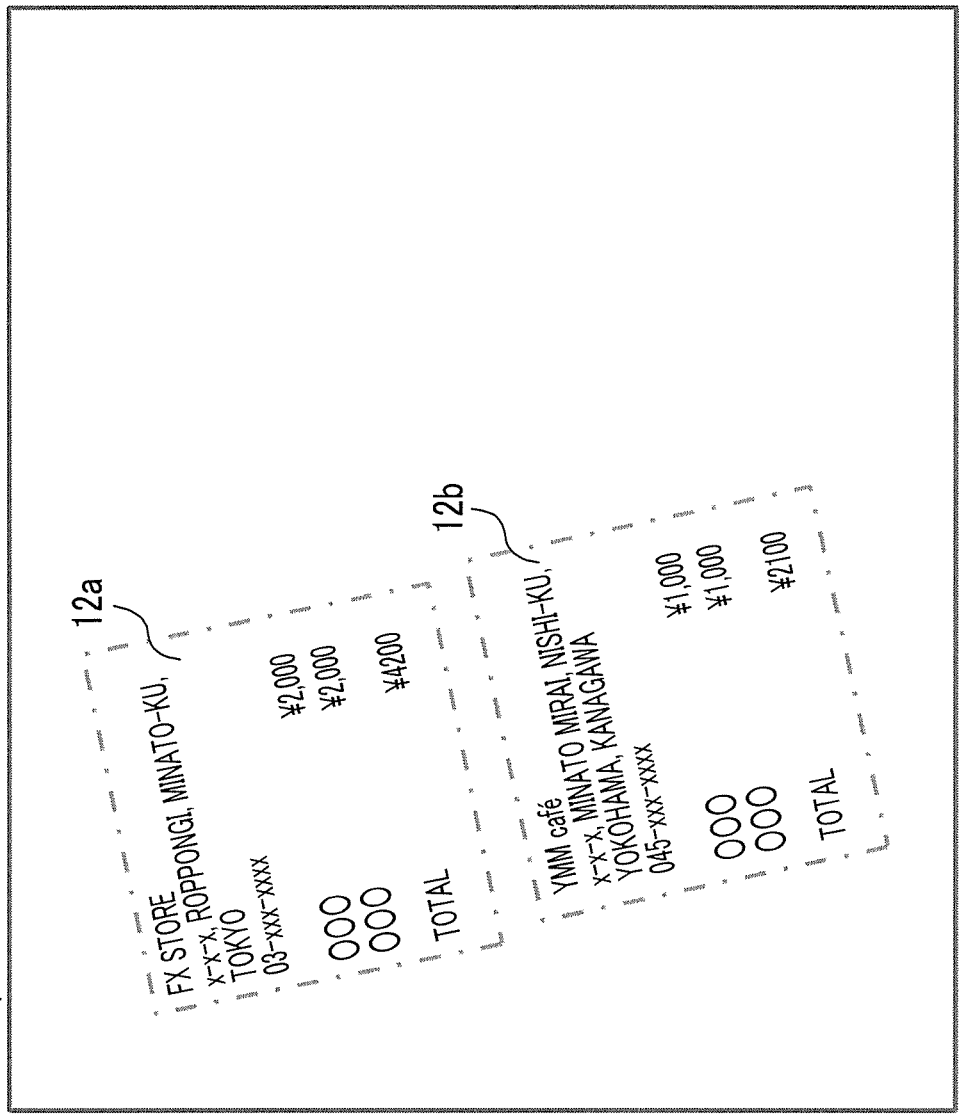
FIG. 3 is a diagram illustrating a scan image in a case where a black background sheet is not used.
Figure 4:
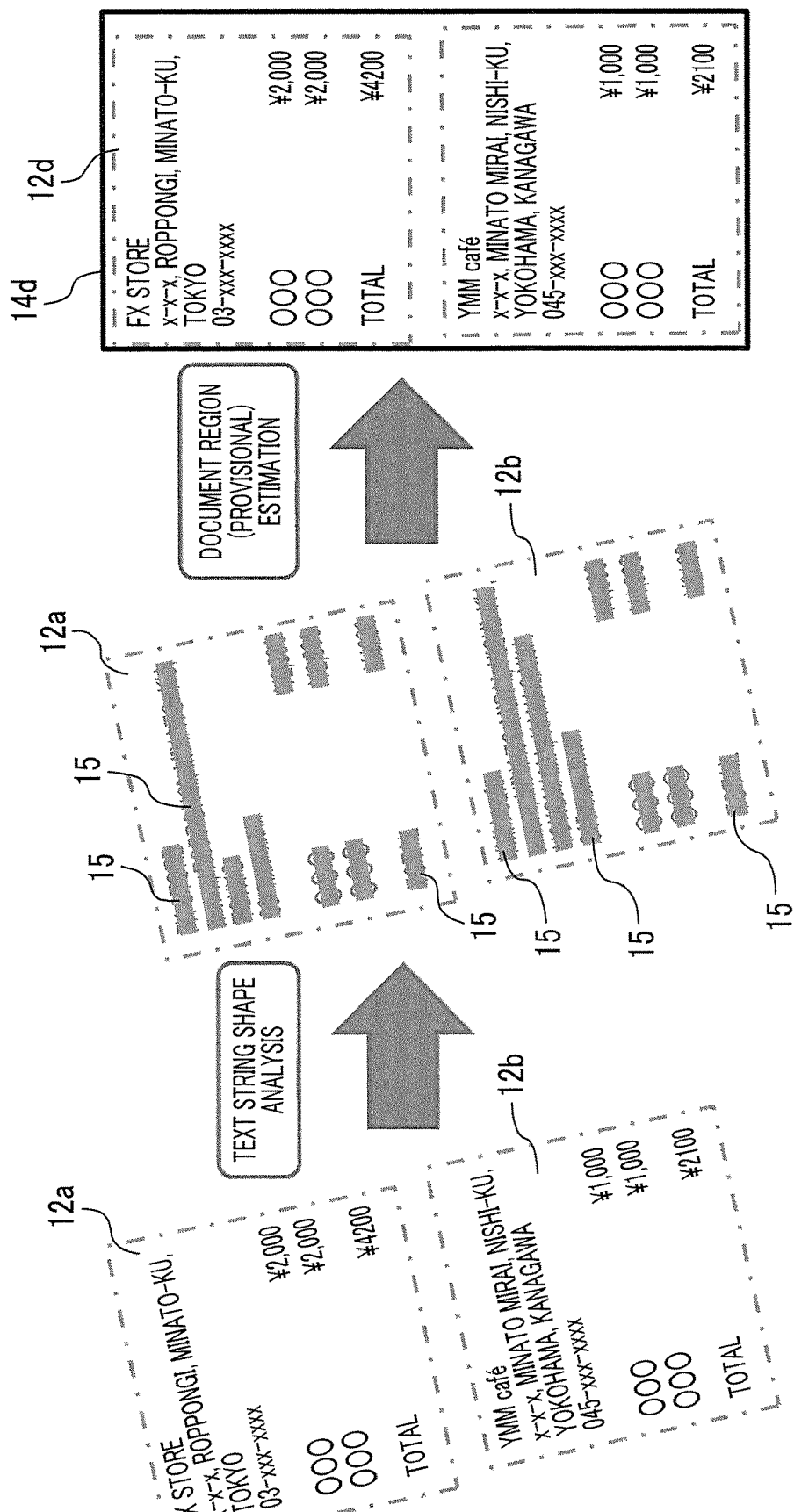
FIG. 4 is a diagram for describing a problem of multi-crop processing in a case where the black background sheet is not used.

Meanwhile, a document cover that covers the platen of the scanner from a rear surface is generally in a color of white. For the multi-crop processing, a special work of covering the platen with the black background sheet prepared separately is required instead of the document cover. In a case where a user is reluctant to do the work or does not know the necessity, a user may perform scanning while covering the platen with the document cover as usual. In this case, even though the documents are separated to some extent, the images of the documents may be extracted as one image without being separated. FIGS. 3 and 4 illustrate such an example.

A scan image 10C illustrated in FIG. 3 illustrates a state in which the two document images 12a and 12b are arranged so as to be slightly separated from each other on the white background of the document cover. In this example, since the background and the ground color of the document images 12a and 12b are the same white, clear edges are hard to appear between the background and the ground. Thus, it is difficult to extract the document images 12a and 12b by the edge detection.

Accordingly, as illustrated in FIG. 4, it is considered that a method of performing text string shape analysis on the scan image and extracting a region 14d of a document image 12d based on information on an image object such as the text string obtained as a result is used.

For example, in the text string shape analysis, rows 15 of text strings included in the scan image 10C are specified by performing layout analysis and row segmentation which are pre-processing for text recognition in an optical text recognition (OCR) technique. In a case where the rows can be specified, a coordinate system in which a direction of the row and a direction perpendicular to the row are x and y-directions, respectively, can be set, and coordinates (for example, coordinates of a circumscribed rectangle of the text string of the row) of the text string of each line within this coordinate system are required. In a case where an x-coordinate of a left end (in the case of a language of which a writing direction progresses from left to right) of the text string of each row is searched for in order from the upper row, it is determined that sections of which the x-coordinate is almost the same are within a region of the same document. However, in a case where a distance between adjacent rows is larger than a predetermined threshold value, it is determined that the section to which the preceding row belongs and the section to which the following row belongs are separate document regions.

As another example of estimation processing of the document region using the text string shape analysis, there is processing described in the specification, the claims, and the drawings of Japanese Patent Application No. 2019-229599 filed on Dec. 19, 2019 by the present applicant. In this processing, regions of pixel groups of foregrounds (that is, the text and the images present on the white ground) are specified by sequentially applying an expansion filter and a contraction filter to the scan image, and foreground regions belonging to the same document are determined based on a distance between the foreground regions and an area of a gap between these regions. A collection of the foreground regions belonging to the same document is integrated as a region of one document image.

In the text string shape analysis, the document region may be obtained in consideration of not only the analysis method based on the text recognition result but also information on the edges extracted from the scan image. Even though the extracted edges are thin or fragmentary, the document region can be accurately extracted by combining with the result of the analysis method based on the text recognition result compared to a case where the edge-based method or the analysis method based on the text recognition result is used alone.

As illustrated in FIG. 4, in the estimation of the document region based on the text string shape analysis, since the two documents are arranged so as to be close to each other, a gap between the row 15 at the lowest end of the document image 12a and the row 15 at the highest end of the document image 12b is not sufficiently large, these documents are extracted as one document image 12d.

As described above, a plurality of document images to be separately extracted may be extracted as one image regardless of whether or not the black background sheet is used.

Outline of Solution

An outline of processing executed by an information processing apparatus according to this exemplary embodiment for coping with such an event will be described with reference to FIG. 5.

This processing is executed on the document image 12d within the document region 14d estimated by the estimation processing using the edge detection or the text string shape analysis. In this processing, a word or a phrase corresponding to a predetermined item (hereinafter, referred to as a "key item") is searched for from the document image 12d, as an item included in the document ("key item search" processing in this diagram).

The document includes various items such as a name, a company name, an address, a telephone number, an e-mail address, a product name, a total amount of money, and credit card payment information. In the case of the same kind of documents, there are some items supposed to be included. Such items are key items. For example, in the case of a receipt, examples of the key items include a company name of an issuer, an address, and a total amount of money, and in the case of a business card, examples of the key items include a name, a company name, an address, and contact information such as a telephone number. One or more key items are set for each document kind.

FIG. 6 illustrates key item management information for the document of the kind called the business card which is included in the information processing apparatus. The key item management information of this example includes fields of an item ID, a detected flag, a specific item, and a determination condition. The item ID is identification information for uniquely identifying each key item. Although it has been described in this example that the name indicating the meaning of the item is used as the item ID, this example is merely a convenient example in which intelligibility is prioritized. The detected flag is a flag indicating whether or not a phrase corresponding to the key item is detected from the document image, and is used for recording the key item detected in a processing procedure to be described later. A value of this flag is "OFF" in a case where the word or phrase is not detected, and is "ON" in a case where the word or phrase is detected. The specific item is a specific item corresponding to the key item, and is particularly used to determine that the key item is found in a case where the phrase corresponding to one or more of a plurality of specific items is found. That is, the plurality of specific items included in one key item is a so-called OR condition for determining that one key item is found. For example, in any of a case where only the telephone number is found, a case where only the mail address is found, and a case where both of the telephone number and the mail address are found, the specific item is used for determining that the key item "contact information" is found. The determination condition defines a condition in which the phrase corresponding to the item is satisfied for each specific item. For example, as the condition for the phrase corresponding to the key item "company name", there are conditions such as a condition in which the phrase is a phrase registered in a company and organization name database prepared in advance and a condition in which the phrase includes a predetermined text string such as "corporation" or "(corp.)". It is determined that the phrase satisfying at least one of these conditions is a word or a phrase corresponding to the key item "company name" (that is, the OR condition). A condition in which a plurality of individual conditions is defined by a logical expression including an OR condition or an AND condition may be set in the determination condition field. In a case where there is a plurality of specific items belonging to the key item, the determination condition for each specific item is set in the determination condition field.

In a case where one key item includes a plurality of specific items configured to constituting the OR condition, the key item management information may include a searched flag for the specific item in addition to the searched flag for the key item.

Figure 5:
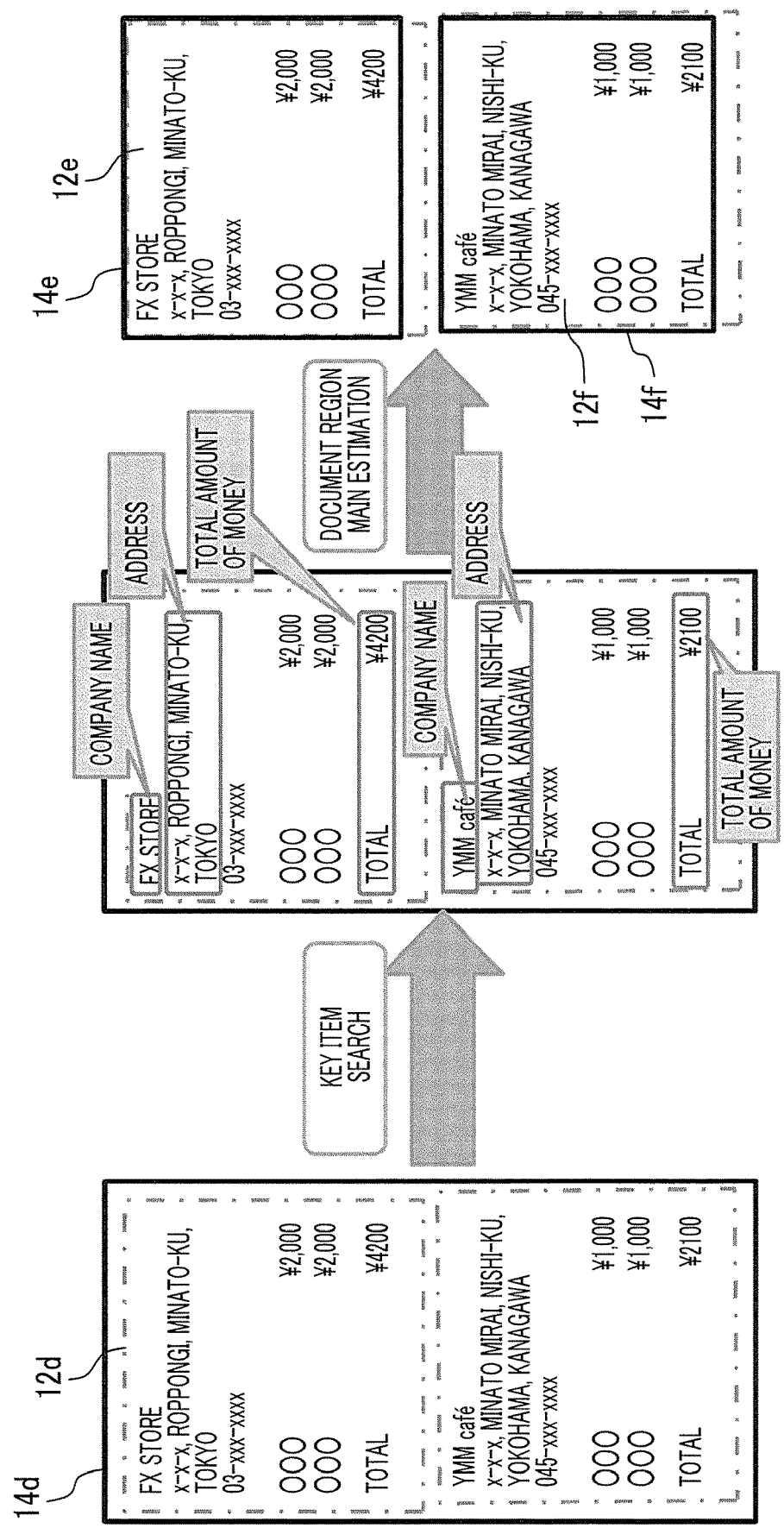
FIG. 5 is a diagram for describing an outline of a method according to an exemplary embodiment.

In the example of FIG. 5, three items of the company name, the address, and the total amount of money are determined as the key items for the document kind "receipt". In the key item search processing, the text strings of the rows are sequentially searched for downward or upward from the upper end or the lower end of the document image 12d, and it is determined whether or not the text strings include simple phrases corresponding to the key items set for the document kind. Continuous sections including the phrases corresponding to these three key items in the arrangement and direction of the rows of the document image, that is, sections that do not include different phrases corresponding to the same key item are estimated as one document region. In the illustrated example, for example, three key items of a company name "FX store", an address "x-x-x, Roppongi, Minato-ku, Tokyo", and a total amount of money "total . . . ¥4200" are sequentially found from the upper end of the region 14d. In a case where the third item is found, it is determined that a section from the upper end of the region 14d or the upper end of the key item found first to the lower end of the third key item is a region 14e of a first document image 12e. Thereafter, while the text strings are further searched downward, three key items of a company name "YMM cafe", an address "x-x-x, Minato Mirai, Nishi-ku, Yokohama, Kanagawa", and a total amount of money "total . . . ¥2100" are sequentially found. Thus, it is determined that a section from an upper end of the company name "YMM cafe" found first among three key items to a lower end of the total amount of money "total . . . ¥2100" found last is a region 14f of a second document image 12f.

As described above, in this exemplary embodiment, the contents of the document image 12d are searched for, and the regions 14e and 14f of the individual document images 12e and 12f are divided based on the key items included in the contents.

In the example to be described below, two-step estimation processing of estimating the region of each document image based on the edge detection or the text string shape analysis and estimating the region of a more strict document from the region of this estimation result based on the searching of the key items. The former estimation is called provisional estimation, and the latter estimation is called main estimation.

Hereinafter, an example of a hardware configuration of the information processing apparatus according to this exemplary embodiment and a specific example of the processing executed by the information processing apparatus will be described.

Hardware Configuration

The hardware configuration of the information processing apparatus according to this exemplary embodiment is illustrated in FIG. 7. The example illustrated in FIG. 7 is a case where the information processing apparatus is a so-called multi-function machine. The multi-function machine may have a function of accepting a request from a client such as a personal computer via a network such as a local area network or communicating with a server on the Internet.

For example, as illustrated in FIG. 7, this information processing apparatus has, as hardware, a circuit configuration in which a processor 102, a memory (master storage device) 104 such as a random access memory (RAM), a controller that controls an auxiliary storage device 106 which is a nonvolatile storage device such as a flash memory, a solid state drive (SSD), or a hard disk drive (HDD), an interface with various input and output devices 108, and a network interface 110 for controlling connection with a network such as a local area network are connected via a data transmission path such as a bus 112. The input and output device 108 includes, for example, a display and input device such as a touch panel, a voice output device such as a speaker, and, a card reader for user authentication. The circuit configuration of the portion described above may be the same as a configuration of a general-purpose computer.

The information processing apparatus includes a scanner control circuit 114, a printer control circuit 116, and a facsimile apparatus 118 which are connected to a computer portion via the bus 112. These portions are provided for various functions of the information processing apparatus (multi-function machine in this example). The scanner control circuit 114 is a circuit for controlling a scanner and an automatic document feeding device incorporated in the multi-function machine, and the printer control circuit 116 is a circuit for controlling a printer incorporated in the multi-function machine. The facsimile apparatus 118 is an apparatus having facsimile transmission and reception functions of the multi-function machine.

The computer portion of the information processing apparatus executes information processing for processing for a user interface (UI), control of data exchange via a network, and control of various functional elements such as the scanner, the printer, and the facsimile apparatus. A program in which the contents of these various kinds of information processing are described is installed in a computer via a network, and is saved in the auxiliary storage device 106. The program stored in the auxiliary storage device 106 is executed by the processor 102 by using the memory 104, and thus, the information processing apparatus according to this exemplary embodiment is realized.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing according to this exemplary embodiment is performed for an image captured by an imaging mechanism (for example, the scanner connected to the scanner control circuit 114) included in the information processing apparatus. Thus, the information processing apparatus may not include the printer and the printer control circuit 116 that controls the printer, and the facsimile apparatus 118. Hereinafter, a case where the information processing apparatus is realized as the multi-function machine will be described, but this case is merely an example. The information processing apparatus may be any apparatus provided with the imaging mechanism, and may be, for example, a scanner apparatus, a kiosk terminal, a smartphone, a tablet terminal, or a personal computer.

Overall Processing Procedure

The overall processing procedure of a method according to this exemplary embodiment executed by the processor 102 of the information processing apparatus will be described with reference to FIG. 8.

This processing is started in a case where the user places one or more documents on the platen of the scanner attached to the information processing apparatus and instructs the information processing apparatus to start executing the "multi-crop" processing. The scanner included in the information processing apparatus executes scanning according to this instruction. The image (hereinafter, this image is referred to as a scan image) obtained by this scanning is an image of a size of the entire platen, and includes one or more document images. This scan image is a target of the processing procedure of FIG. 8.

In a case where the user instructs to start the multi-crop, the processor 102 may request the user to designate the document kind (for example, the business card or the receipt).

Figure 8:
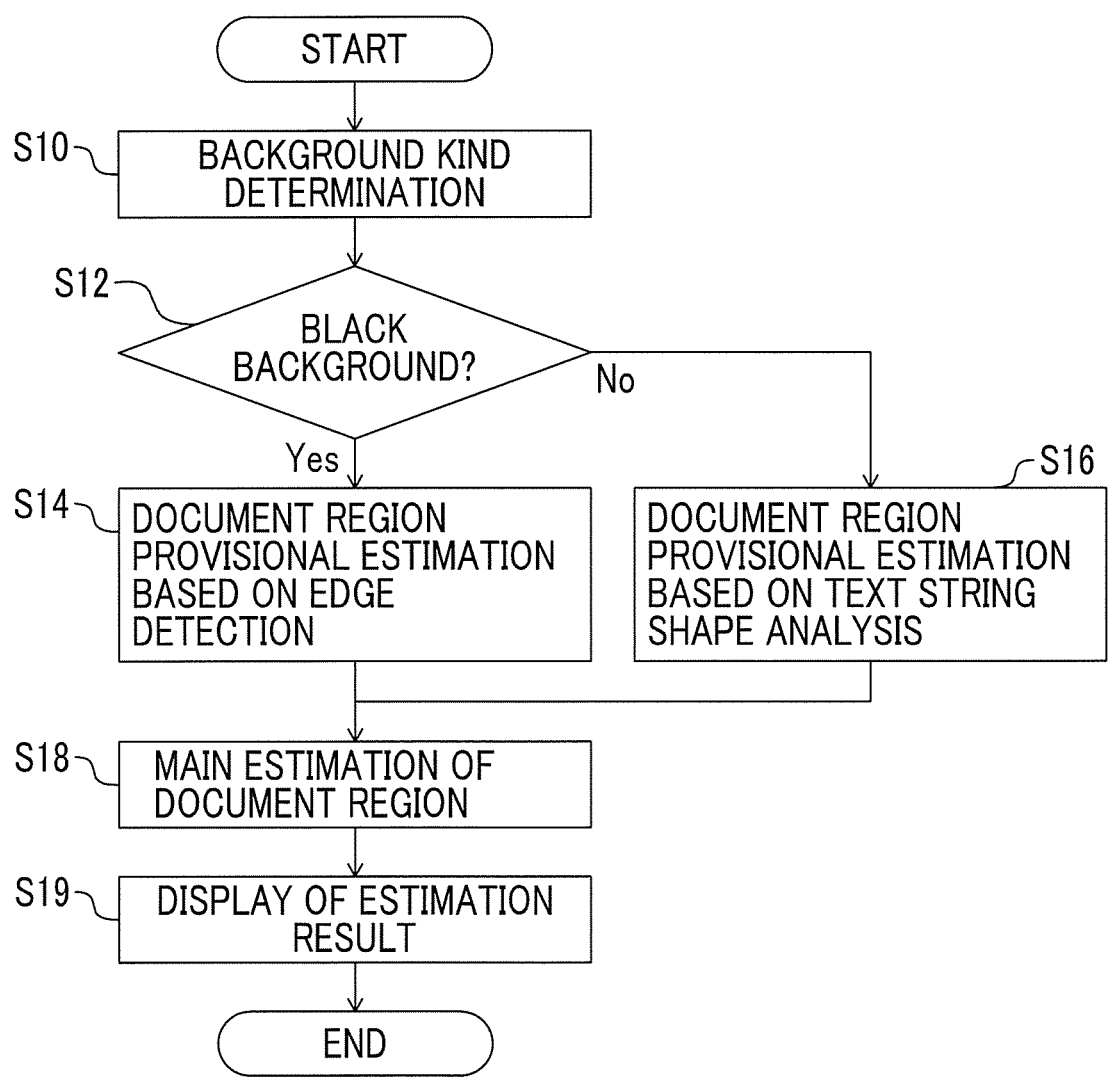
FIG. 8 is a diagram illustrating an overall processing procedure of a method according to the exemplary embodiment.

In the processing procedure of FIG. 8, the processor 102 first determines a kind of the background (S10). This determination is processing of determining whether the background of the scan image is black (that is, the black background sheet is used) or white. In this determination, it is determined that the background is black in a case where an integrated value or an average value of densities of a pixel group of an outer peripheral portion of the scan image is equal to or greater than a threshold value, and is white in the other case.

In a case where the determination result of S10 is Yes, that is, in a case where the background is black, the processor 102 provisionally estimates the document region based on the edge detection (S14). A known technology may be used for the provisional estimation based on the edge detection. In a case where the determination result of S10 is No, the processor 102 executes the provisional estimation of the document region based on the text string shape analysis (S16).

After the provisional estimation of the document region (S14 or S16), the processor 102 executes the main estimation of the document region (S18). The processor 102 displays information on the estimation result obtained by the main estimation on a display device connected to the information processing apparatus (S19).

Example 1 of Main Estimation

Figure 9:
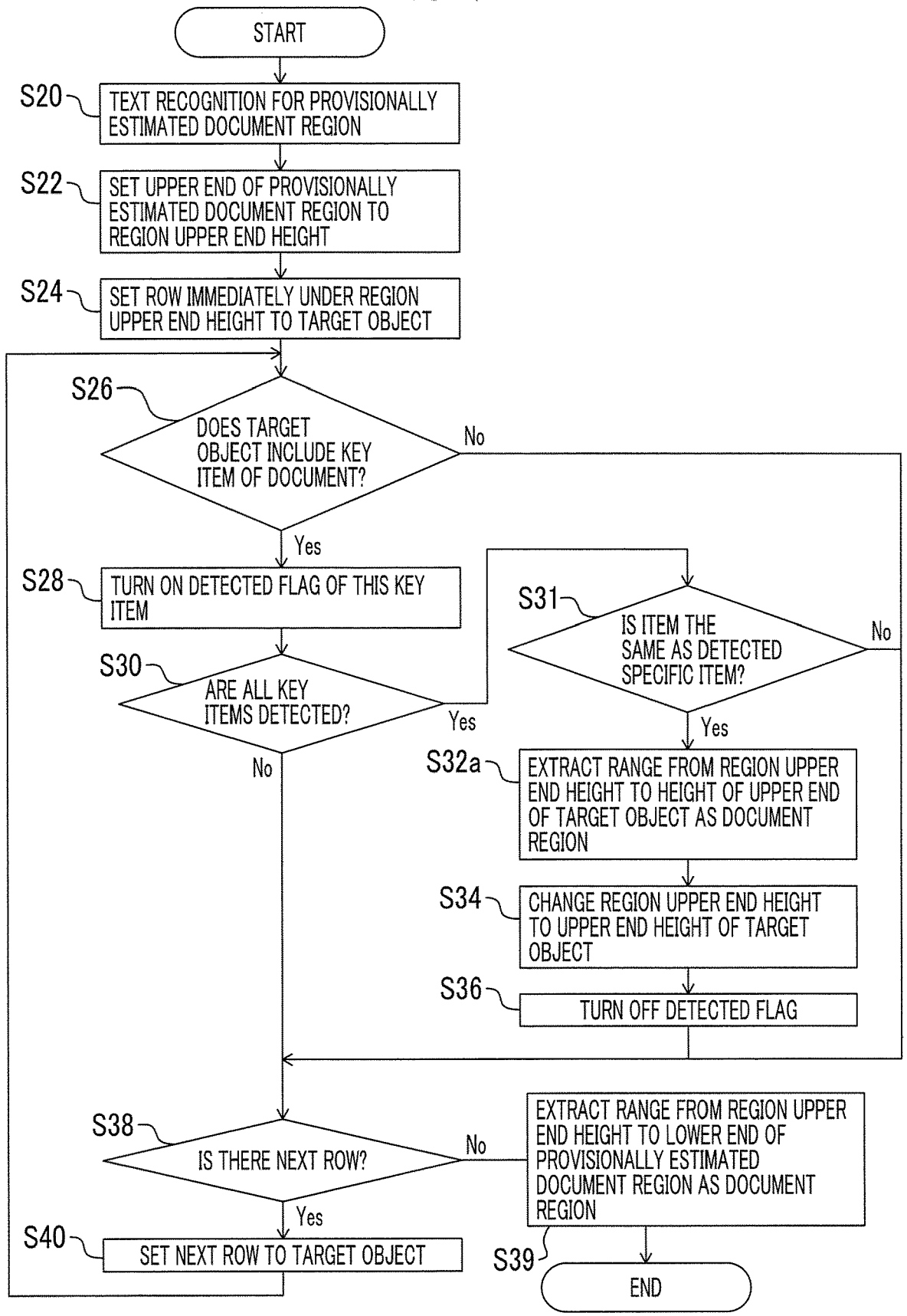
FIG. 9 is a diagram illustrating an example of a processing procedure of main estimation processing.

FIG. 9 illustrates an example of specific processing of S18 of the procedure of FIG. 8. The procedure of FIG. 9 is executed for each document region provisionally estimated in S14 or S16.

In this procedure, first, the processor 102 executes text recognition processing on the document image within the document region of the provisional estimation result which is a processing target (S20). In a case where pre-processing of the text recognition is completed in the provisional estimation (S14 or S16), the text recognition is executed by using the pre-processing result. In S20, recognition of a logo mark of a company may be executed in addition to text recognition. To achieve this, a database in which logo marks of companies are registered may be prepared, and for example, it may be determined whether or not an image that is not the text within the document image matches the logo mark within the database.

The processor 102 sets a height of the upper end of the document region as the processing target to a variable "region upper end height" (S22).

Here, a coordinate system used in this processing will be described with reference to FIG. 10. In this example, a direction in which the rows within the document region 14d as the processing target extend (that is, a direction from left to right in this diagram) is an x-direction, and a direction perpendicular to the x-direction, that is, a direction in which the plurality of rows is arranged is a y-direction. The y-direction is a "height" direction. For clarity, up and down directions in the following description are directions as seen in this diagram. From another point of view, a direction indicated by an arrow in the y-direction illustrated in this diagram is a "down" direction, and an opposite direction is an "up" direction. In this example, a vertex at an upper left corner of the document region 14d is an origin of the coordinate system, and is merely an example.

The "region upper end height" (denoted as "$y_s$" in this diagram) to which a value is set in S22 is a variable that retains a y-coordinate of the upper end of the document region 14d which is the main estimation result.

The processor 102 sets the text string (or the image such as the logo mark) of the row immediately below the region upper end height to a target object in the recognition result of S20 (S24).

Subsequently, the processor 102 determines whether or not the target object includes the phrase corresponding to the key item (S26). In this determination, it is determined whether or not the phrase satisfies the determination condition of the key item management information (see FIG. 6). In a case where any of the determination conditions is satisfied, the determination result of S26 is Yes. At this time, the processor 102 recognizes the key item and the specific item corresponding to the determination condition satisfied by the phrase. In this determination, a model such as a neural network learned to determine the key item and the specific item corresponding to the input phrase may be used instead of preparing an explicit determination condition.

In a case where the determination result of S26 is No, the processor 102 proceeds to S38, and determines whether or not the next row of the target object is present within the document image 12d. In a case where the result of this determination is No, the processing is completed up to the end of the document region 14d. Thus, for example, after the range from the region upper end height to the lower end of the document region 14d is extracted as one document region (S39), the procedure of FIG. 9 is ended. In a case where the determination result of S38 is Yes, the processor 102 changes the target object to the next row, and repeats processing of S26 and subsequent steps.

In the determination result of S26 is Yes, the detected flag of the key item included in the target object recognized in S26 is set to ON (S28). At a start point in time of the procedure of FIG. 9, it is assumed that the detected flags of all the key items are OFF. Subsequently, the processor 102 determines whether or not all the key items corresponding to the document kind are detected by referring to the detected flag in the key item management information (S30).

The processor 102 proceeds to S38 in a case where the determination result of S30 is No, and changes the target object to the next row and repeats processing of S26 and subsequent steps in a case where there is the next row of the target object.

In a case where the determination result of S30 is Yes, the processor 102 determines whether or not the specific item recognized in S26 is the same as the specific item already detected before S26 (S31). In a case where the result of this determination is Yes, all the key items to be included in one document image are detected at this point in time, and the specific item of the key item found at this point in time is the specific item having the same kind as the kind of the specific item of the key item included in the document image. This case means that the searching of the region of one document image is ended, and the first row (=current target object) of the region of the next document image is found. In this case, the processor 102 extracts, as one document region, the range from the region upper end height in the y-direction to the height of the upper end of the target object in the document region 14d of the provisional estimation result (S32a). The document region extracted at this time is one of the results of the main estimation. Subsequently, the processor 102 changes the region upper end height to the height (=y coordinate) of the upper end of the current target object (S34). The next document region extends downward from the region upper end height.

Figure 10:
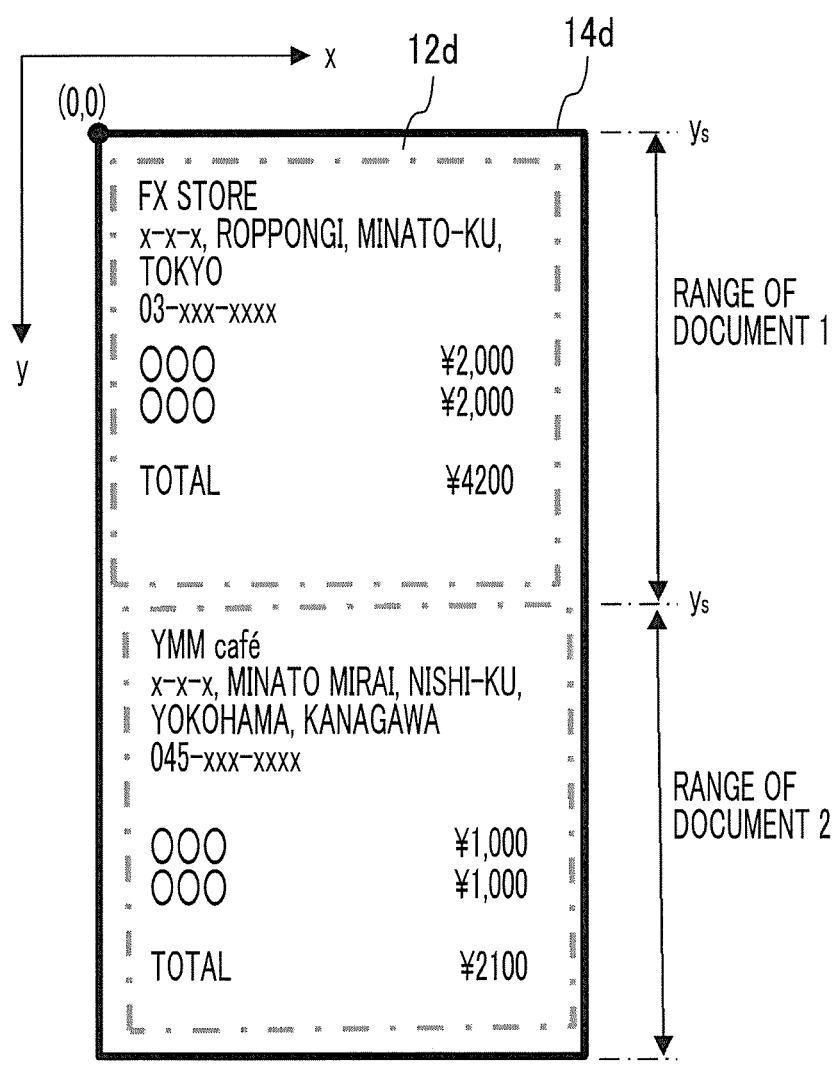
FIG. 10 is a diagram for describing main estimation according to the procedure of FIG. 9.

In the case of the example in FIG. 10, the phrases "FX store", "x-x-x, Roppongi, Minato-ku, Tokyo", and "total . . . ¥4200" corresponding to "company name", "address", and "total amount of money" which are the key items and the specific items are found in this order while sequentially searching for from the upper end of the document region 14d. The subsequent phrase "YMM cafe" corresponds to "company name" which is the key item and the specific item. Thus, the determination result of S31 is Yes for the phrase "YMM cafe". Accordingly, in S32a, the range (for example, the smallest rectangle circumscribing these text strings) of the document region 14d from the upper end of the document region 14d to the upper end of the region of the phrase "YMM cafe" is extracted as the first document region. In S34, the upper end of the region of the phrase "YMM cafe" is set to the region upper end height of the next document region.

After S34, the processor 102 resets the searched flags of all the items within the key item management information to OFF (S36), and proceeds to the processing of S38.

According to the processing procedure of the main estimation illustrated above, in the example illustrated in FIG. 10, two document regions of a document 1 and a document 2 illustrated in this diagram are obtained as the main estimation results from the document region 14d of the provisional estimation result.

Example 2 of Main Estimation

Another example of the processing procedure of the main estimation will be described with reference to FIG. 11. Of the processing procedure of FIG. 11, the same steps as the steps of the processing procedure of FIG. 9 are denoted by identical reference numerals, and redundant description will be omitted.

Figure 11:
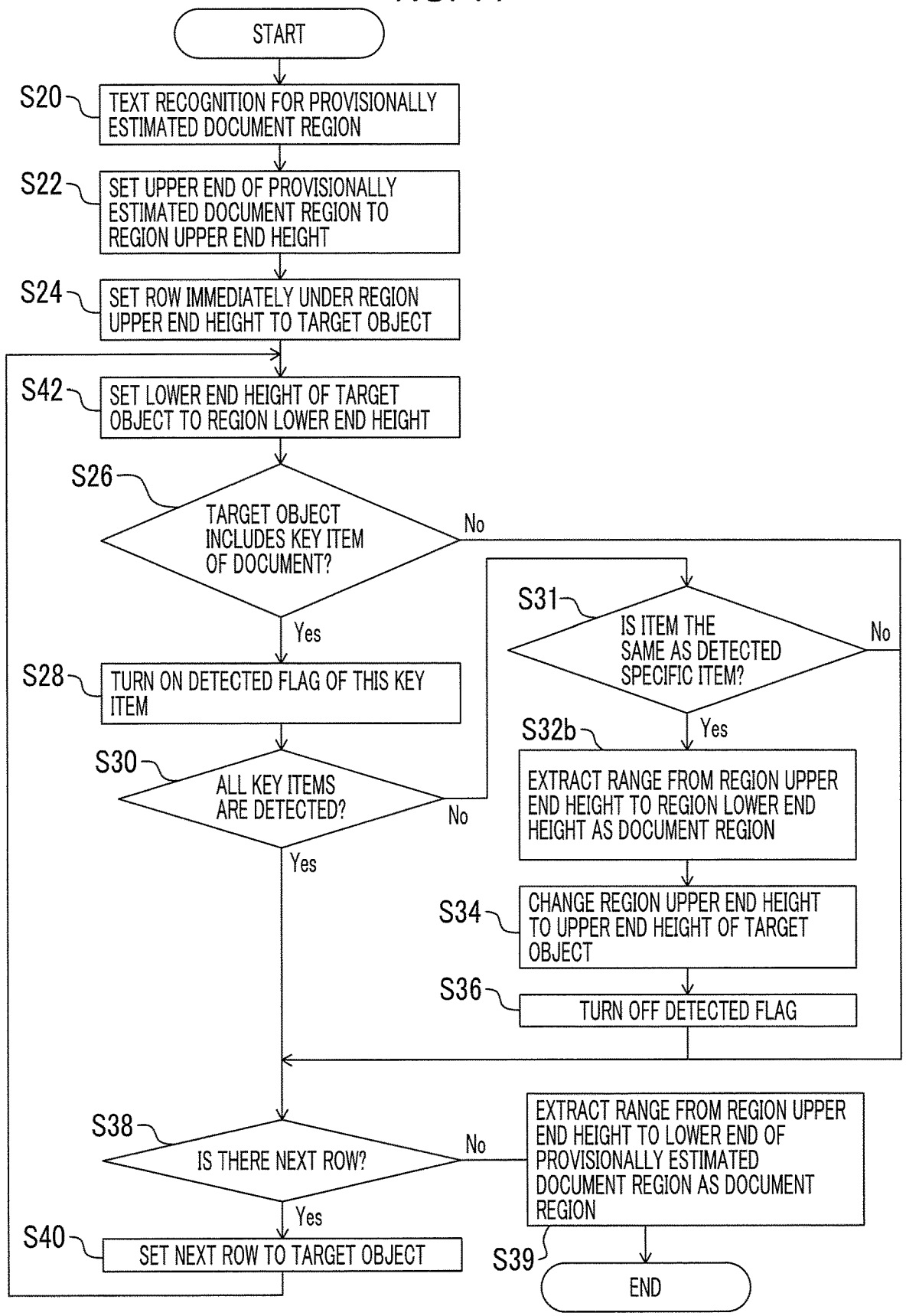
FIG. 11 is a diagram illustrating another example of the processing procedure of the main estimation processing.

In the processing procedure of FIG. 11, S32a of the procedure of FIG. 9 is replaced with S32b, and S42 is inserted between S24 or S40 and S26. In this procedure, the processor 102 sets the lower end of the target object to a variable "region lower end height" after S24 or S40 (S42). That is, the region lower end height is updated to the lower end of the found row whenever the next row is found. In a case where the determination result of S31 is Yes, the processor 102 extracts, as one document region, the range from the region upper end height to the region lower end height at this point in the document region of the provisional estimation result (S32b).

Figure 12:
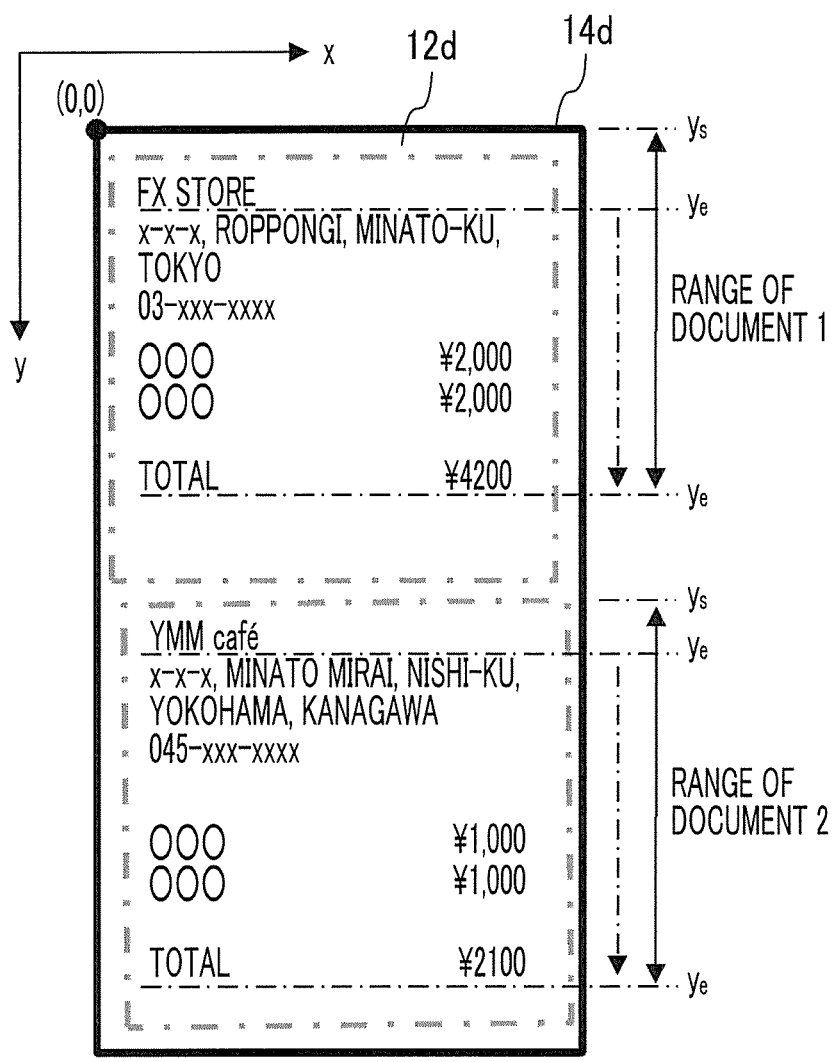
FIG. 12 is a diagram for describing the main estimation according to the procedure of FIG. 11.

According to this procedure, as illustrated in FIG. 12, first, the upper end of the document region 14d of the provisional estimation result is set to a region upper end height $y_s$ (S22), and the lower end of the "FX store" in the uppermost row is set to a region lower end height $y_e$ (S42). Thereafter, while the phrases of the rows are searched for in order from the top, the region lower end height is decreased row by row. At a point in time at which the processing reaches the row of the phrase "YMM cafe", the determination result of S31 is Yes. At this point in time, the height of the lower end of the preceding row "total . . . ¥4200" is set to the region lower end height. Thus, in S32b, the range from the upper end of the document region 14d to the lower end of "total . . . ¥4200" is extracted as the first document region. Thereafter, the second document region is extracted in the same manner.

Figure 13:
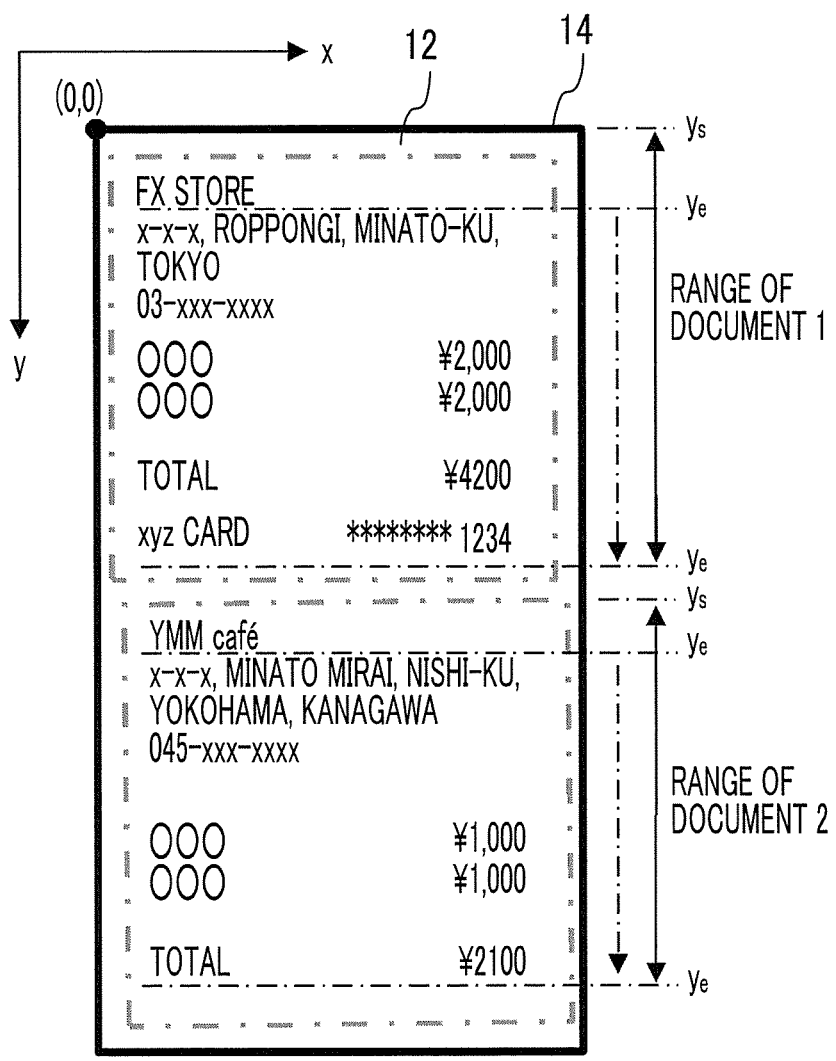
FIG. 13 is a diagram for describing the main estimation according to the procedure of FIG. 11.

According to the procedure of FIG. 11, in a case where the document image includes items that are not the key items after all the key items, the document region including the latter items is extracted. An item "xyz card ******** 1234" indicating a card number that is not the key item after three key items "FX store", "x-x-x, Roppongi, Minato-ku, Tokyo", and "total . . . ¥4200" of the document 1 is included in the document image 12 illustrated in FIG. 13. According to the procedure of FIG. 11, the region from the region upper end height to the lower end of this item is extracted as the document region of the document 1.

Example 3 of Main Estimation

Figure 14:
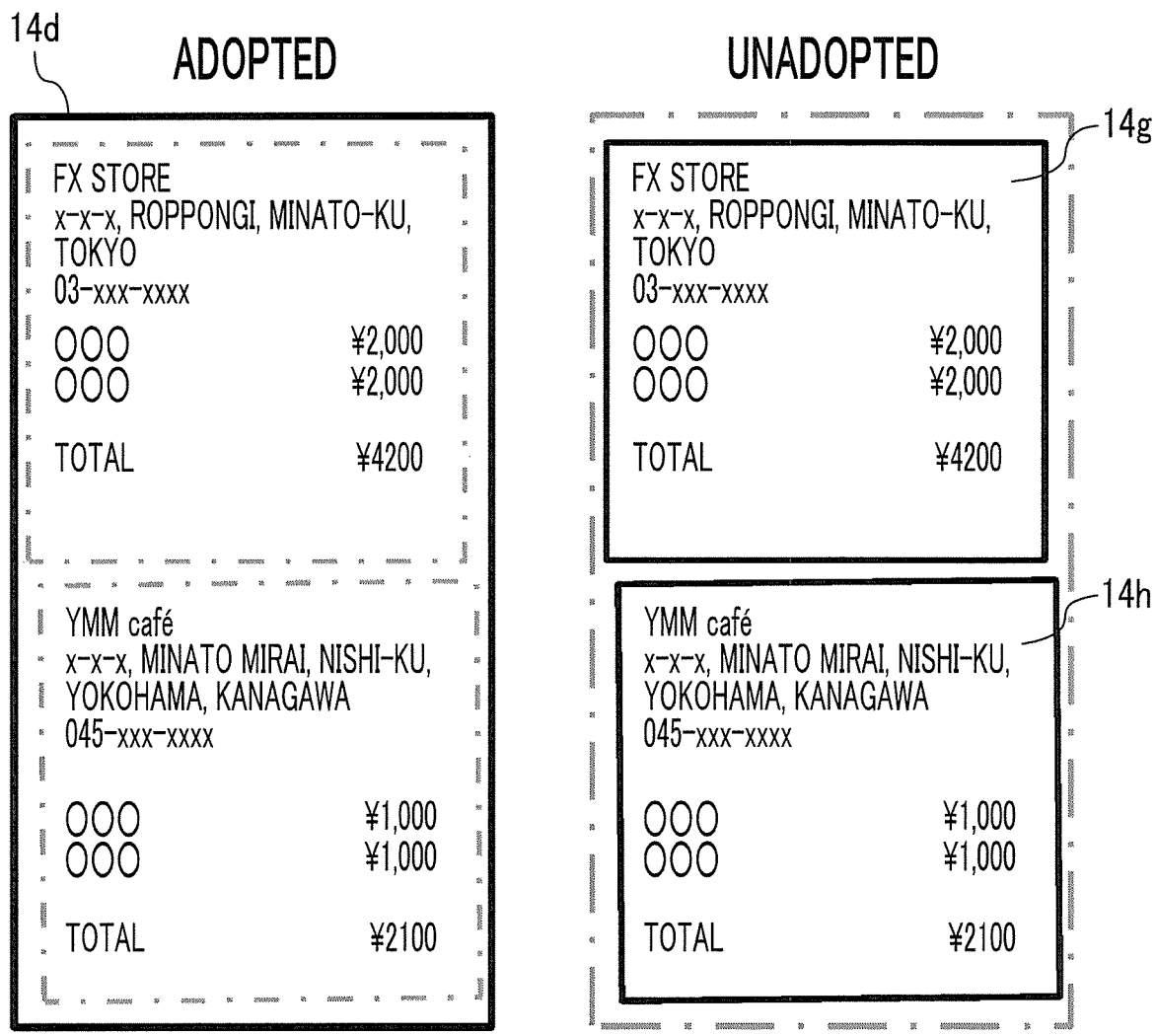
FIG. 14 is a diagram for describing that a plurality of patterns of a document region is obtained by provisional estimation and one pattern of these patterns is adopted as a provisional estimation result.

This example is premised on a method for obtaining a plurality of patterns as patterns of the document region and selecting the best one of the plurality of patterns as the provisional estimation result in the provisional estimation (S14 and S16). For example, in the extraction processing of the document region using the edge detection in the related art, a score indicating certainty of the pattern is calculated for each obtained pattern of the document region. The pattern having the highest score is automatically adopted, and the image of each document region indicated by the pattern is extracted and output. In the case of such a method, a plurality of unadopted document regions having different patterns may be included in the document region of the provisional estimation result which is the target of the procedure of FIG. 9 or 11. In the example illustrated in FIG. 14, there is an unadopted pattern that is not adopted including two document regions 14g and 14h in addition to the pattern including only the adopted document region 14d. The processor 102 stores information on such unadopted patterns in the memory 104.

Figure 15:
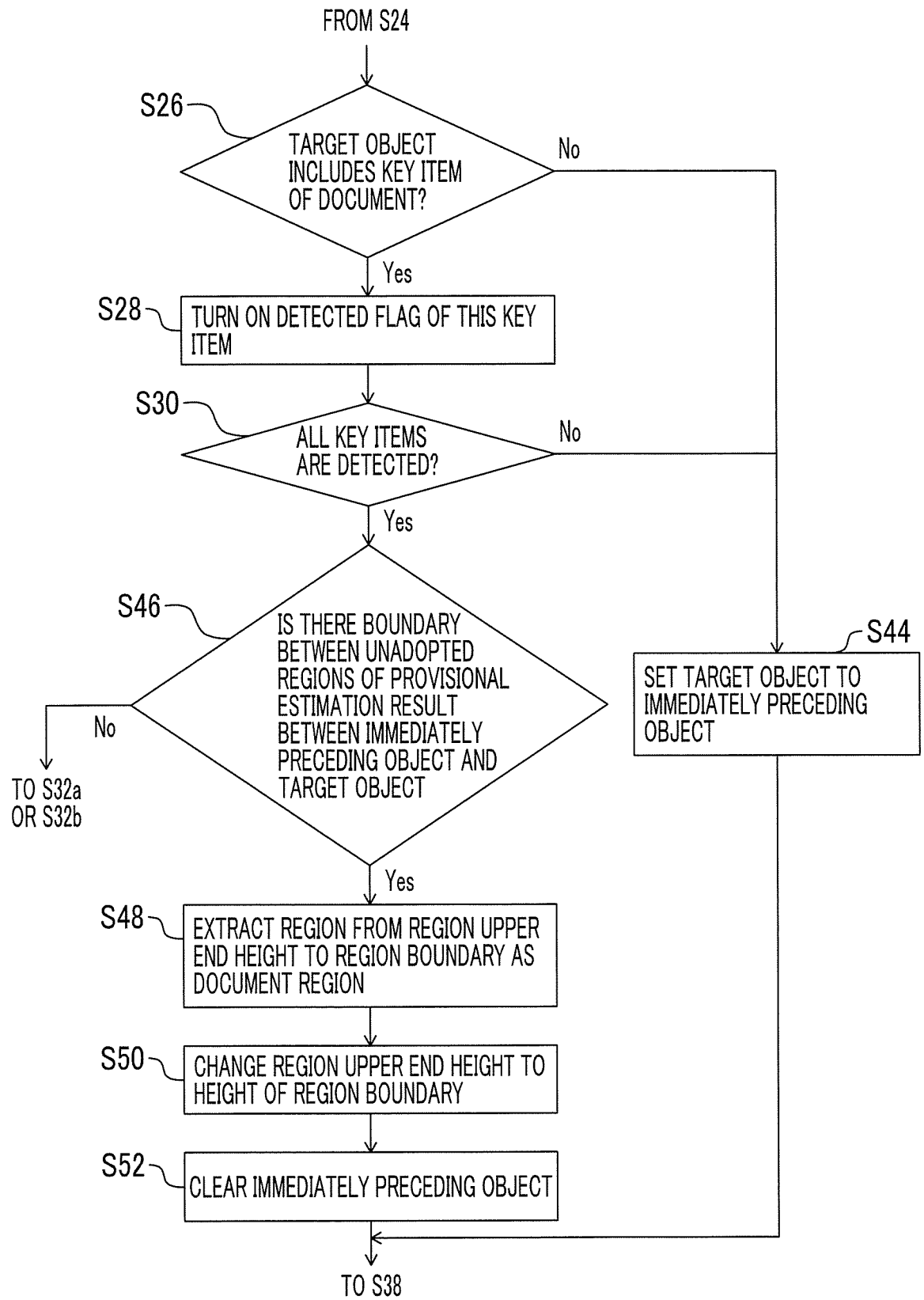
FIG. 15 is a diagram illustrating a characteristic portion of the main estimation processing using information on a document region of a pattern that is not adopted in the provisional estimation.
Figure 16:
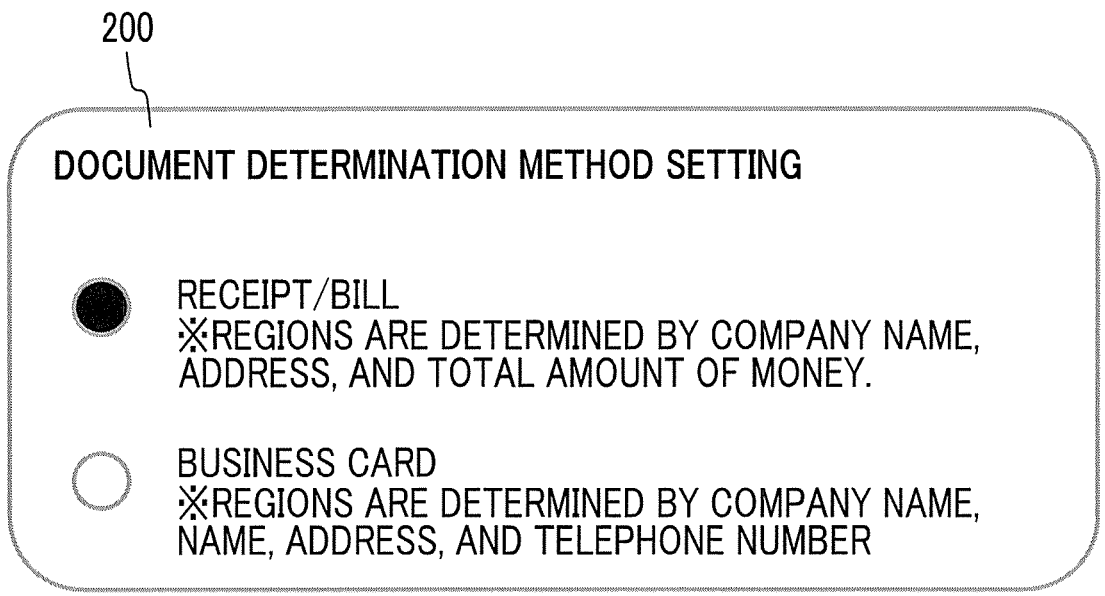
FIG. 16 is a diagram illustrating an example of a setting screen of a document determination method.

A characteristic portion of the procedure of this example is illustrated in FIG. 15. The procedure illustrated in FIG. 15 replaces a step group between S24 and S38 in the procedure of FIG. 9 or 11.

In this procedure, a variable that retaining an immediately preceding object which is the preceding object of the target object is prepared. In a case where the determination result of S26 is No, the processor 102 sets the current target object to the variable of the immediately preceding object (S44), and proceeds to S38.

In a case where the determination result of S26 is Yes, the processor 102 executes the processing of S28 and S30. In a case where the determination result of S30 is No, S44 is executed, and the processing proceeds to S38.

In a case where the determination result of S30 is Yes, the processor 102 determines whether or not there is a boundary between adjacent document regions in the unadopted pattern between the lower end of the immediately preceding object and the upper end of the target object (S46). In a case where the result of this determination is Yes, the processor 102 extracts, as the document region of the main estimation result, the range from the region upper end height to the boundary of the document region of the provisional estimation result which is the processing target (S48). The processor 102 changes the region upper end height to the height of the boundary (S50), clears the immediately preceding object to be empty (S52), and then proceeds to S38.

In S46, two lines may be detected as boundary between the document regions of the unadopted pattern. For example, in the example of FIG. 14, there are a line of the lower end of the document region 14g and a line of the upper end of the document region 14h between the "total . . . ¥4200" and the "YMM cafe" within the unadopted pattern. In this case, in S48, the region from the region upper end height to the upper line of the two lines is extracted as the document region. In S50, the lower line of the two lines is set to the region upper end height.

In the above description, since the example of the procedure based on the procedure of FIG. 9 or FIG. 11 is described, the searching is performed from the upper end to the lower end of the document region of the provisional estimation result, but directivity of such searching may not be required for the method of Example 3. In this method, since the boundary between the document regions of the unadopted pattern is used as the boundary of the document regions of the main estimation result, the positions of the extracted key items may be ascertained. Information on the order in which each of these key items is found is unnecessary.

As described above, in the method of this example, in a case where the document region of the related art included in the document region of the provisional estimation result is extracted, the information of the document region of the pattern that is not adopted, that is, is not selected as the provisional estimation result is used. In Examples 1 and 2 of the main estimation, the document regions are divided in units of the rows of the text recognition result. Thus, the document region of the main estimation result does not include a white ground part and a part other than the key item included in the document image of the related art, or conversely includes an empty part between the document images of the related art. In contrast, the patterns that are not adopted as the provisional estimation result may include the pattern that is not adopted in the comprehensive evaluation but include the document region close to the outer peripheral of the original document image. In the method of this Example 3, the boundary between the document regions of the unadopted pattern is adopted, and thus, there is a possibility that the document region can be estimated more accurately than in the cases of Examples 1 and 2.

Example of Setting Screen

The information processing apparatus according to this exemplary embodiment provides a setting screen 200 for a document determination method in the multi-crop processing to a user. On the setting screen 200, selection of the document kind is accepted as information for specifying the document determination method.

On the setting screen 200 illustrated in this diagram, two kinds "receipt/bill" and "business card" are selected as the document kinds in an alternative manner. On the setting screen 200, an explanation of "※region is determined by company name, address, and total amount of money." is displayed as a determination method corresponding to the document kind "receipt/bill". This case indicates that three key items of the company name, the address, and the total amount of money are used as the key items of the main estimation. In the case of the document kind "business card", the company name, the name, the address, and the telephone number as the key items of the main estimation are illustrated on the setting screen 200.

The user selects the kind of the document as the current processing target is selected on the setting screen 200 before the user instructs to start the execution of the multi-crop processing.

Figure 17:
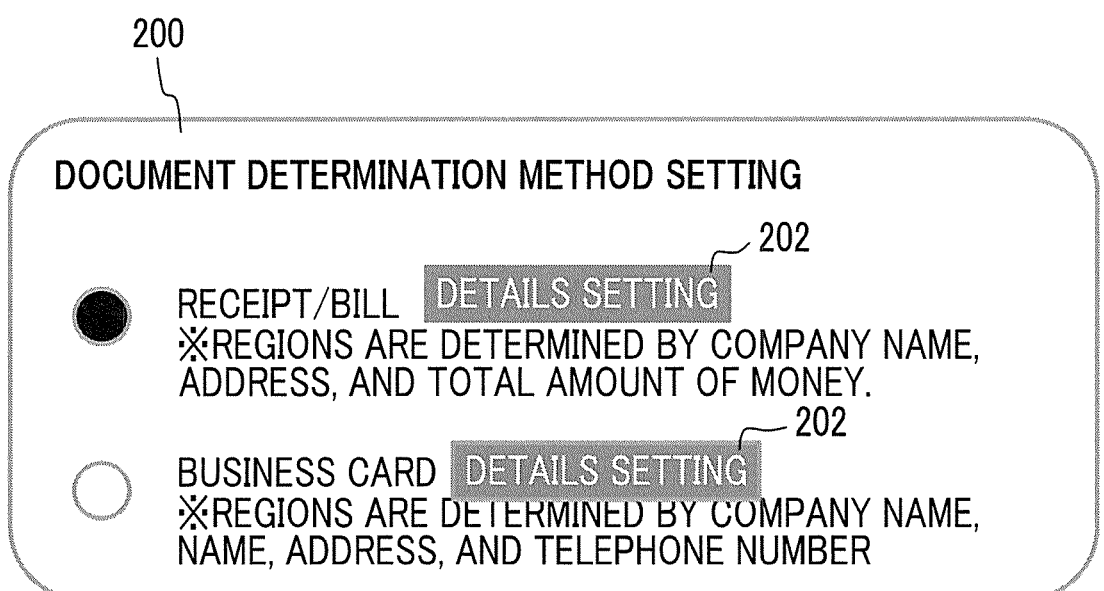
FIG. 17 is a diagram illustrating another example of the setting screen of the document determination method.
Figure 18:
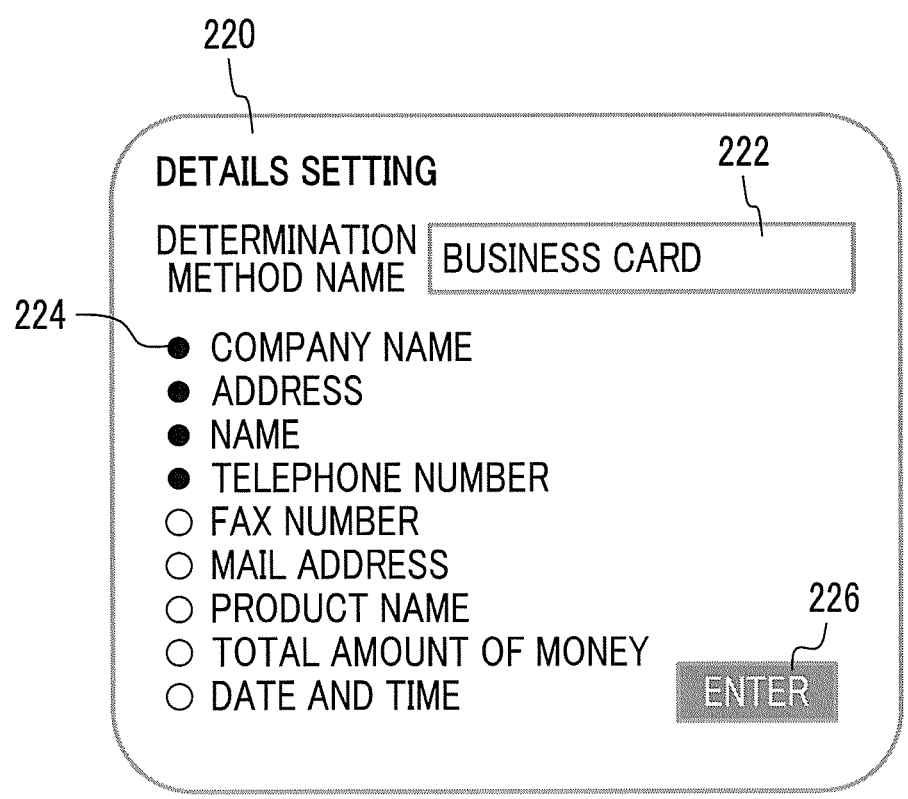
FIG. 18 is a diagram illustrating an example of a detailed setting screen.

A button 202 for a detailed setting is displayed for each selectable document kind on the setting screen 200 illustrated in FIG. 17. In a case where the user presses this button 202, the processor 102 displays a screen 220 (see FIG. 18) that accepts the detailed setting of the determination method for the corresponding document kind. For example, in a case where the user presses the button 202 corresponding to the document kind "business card", the screen 220 in which "business card" is set in a determination method name field 222 is displayed. Items selectable as the key items are listed within this screen 220, and check boxes 224 indicating whether or not each item is selected are arranged on left sides of the items. Items of which the check boxes 224 are in black are items that are selected as the key items, and items of which the check box 224 are in white are items that are not selected as the key items. In a case where there is an unnecessary item among the selected items, the user changes the unnecessary item to an unselected state by touching the unnecessary item, for example. In a case where there is an item necessary as the key item among the unselected items, the user changes the necessary item to a selected state by touch operation. The user presses an enter button 226 at a stage at which the necessary key item is selected. Accordingly, the processor 102 returns to the display of the setting screen 200. On the setting screen 200 displayed at this time, the item group selected on the screen 220 are listed in the field of the explanation of the determination method of "business card".

Example of Display Screen of Main Estimation Result

An example of an estimation result screen 300 displayed on the display device included in the information processing apparatus in S19 of the procedure of FIG. 8 will be described.

Figure 19:
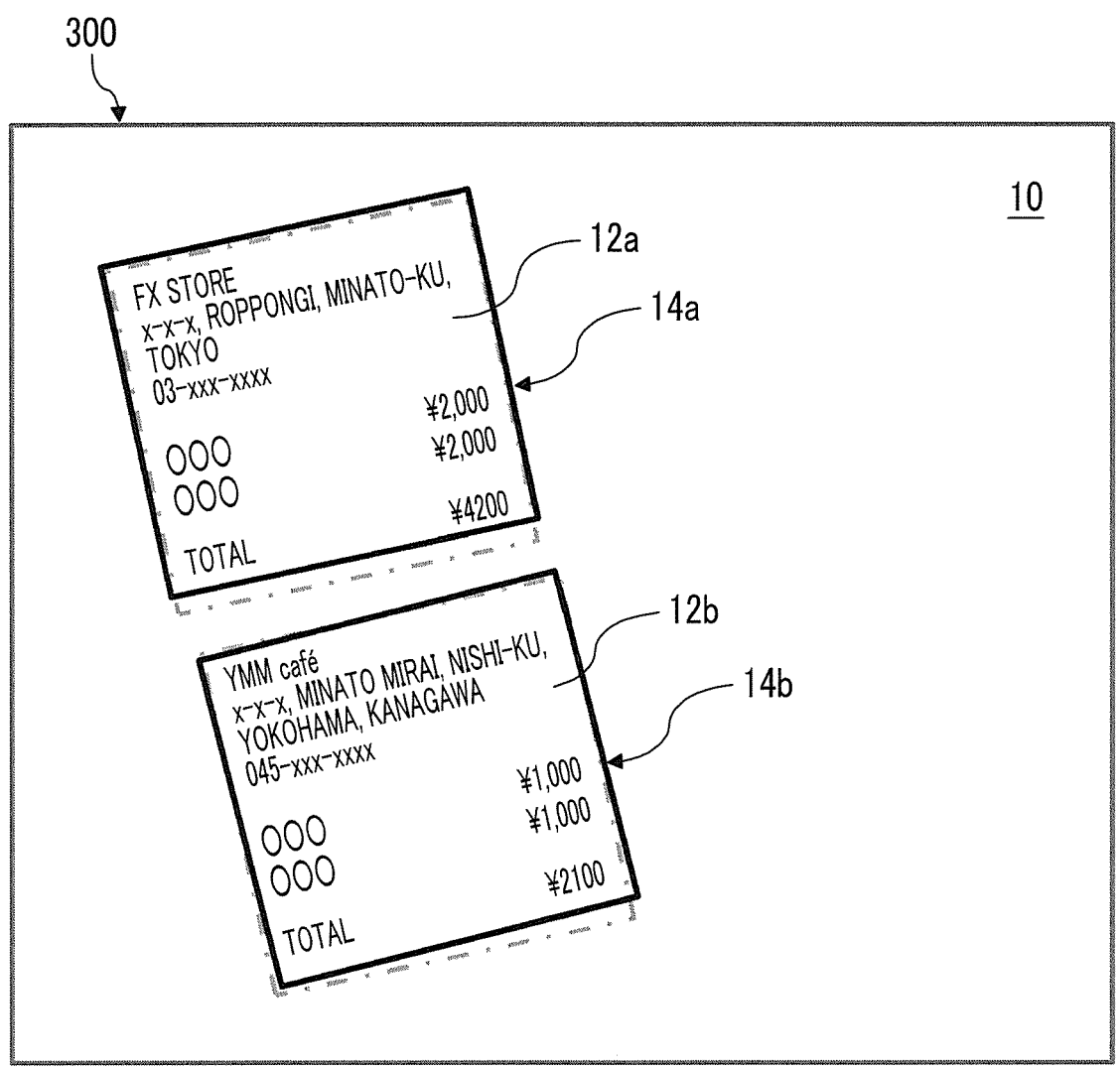
FIG. 19 is a diagram illustrating an example of an estimation result screen for displaying a main estimation result.

The estimation result screen 300 illustrated in FIG. 19 is displayed by superimposing the document regions 14a and 14b of the main estimation result on the scan image 10. The document images 12a and 12b are displayed within the scan image 10. In the illustrated example, the document regions 14a and 14b are in forms of frame lines surrounding the regions including the key item groups within the corresponding document images 12a and 12b, respectively. However, the display form of the illustrated frame lines is merely an example.

The arrangement of the document images 12a and 12b and the document regions 14a and 14b within the estimation result screen 300 illustrated in FIG. 19 is a mirror image arrangement with respect to a state in which the user views the platen from above. Thus, in the arrangement of FIG. 19, there is a possibility that it is difficult for the user to recognize a relationship between the documents placed on the platen and the document regions 14a and 14b within the estimation result screen 300.

Figure 20:
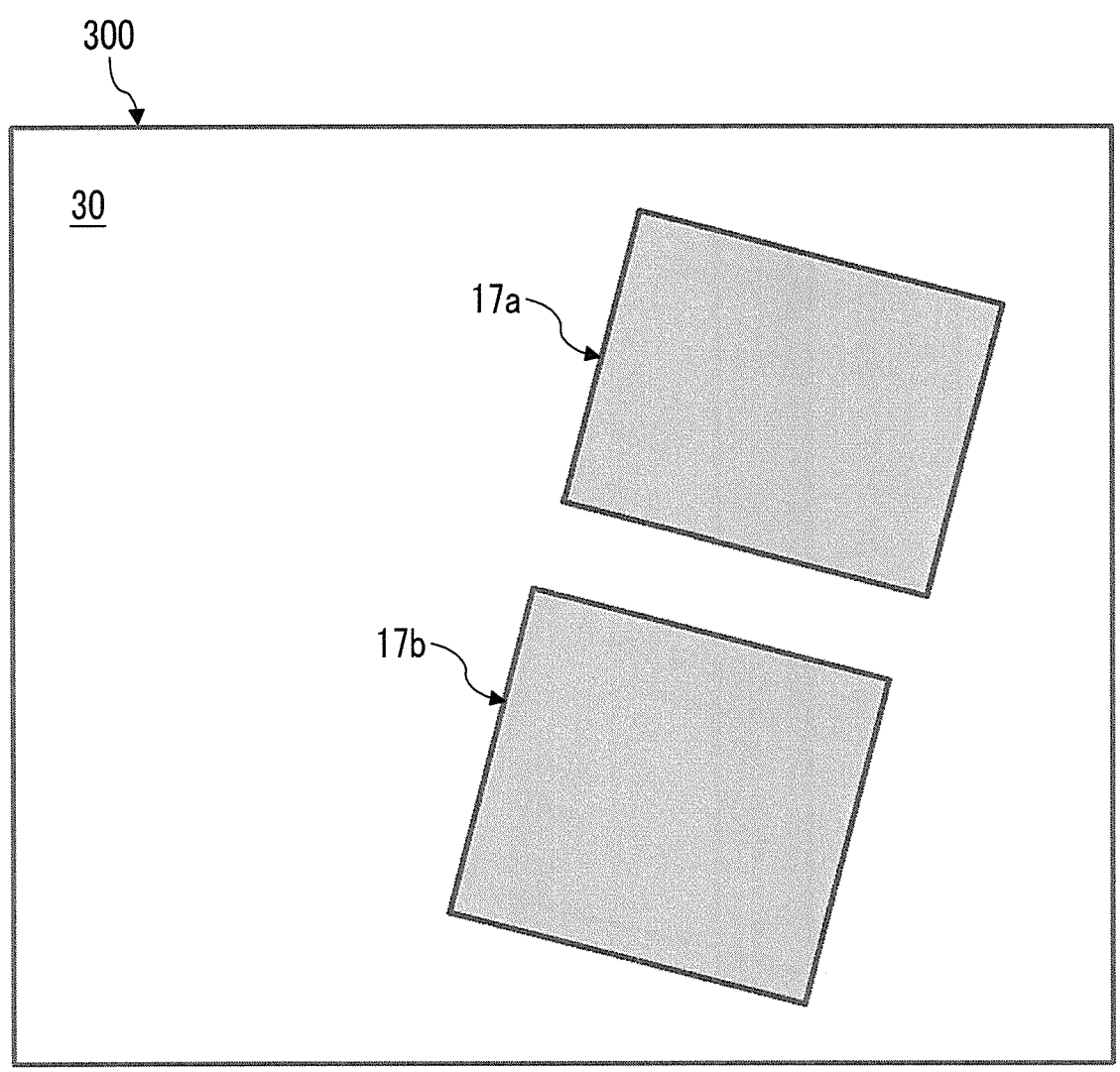
FIG. 20 is a diagram illustrating another example of the estimation result screen for displaying the main estimation result.

Accordingly, document region images obtained by converting the document regions 14a and 14b obtained from the scan image 10 into the mirror image arrangement within a background image 30 indicating the range of the platen are displayed as document region images 17a and 17b on the estimation result screen 300 illustrated in FIG. 20. Since the arrangement of the document region images 17a and 17b on the estimation result screen 300 of FIG. 20 corresponds to the arrangement of two documents on the platen, it is easy for the user to recognize a correspondence between the two images. However, the image contents of the documents corresponding to the document region images 17a and 17b are not displayed on the estimation result screen 300 illustrated in FIG. 20.

Figure 21:
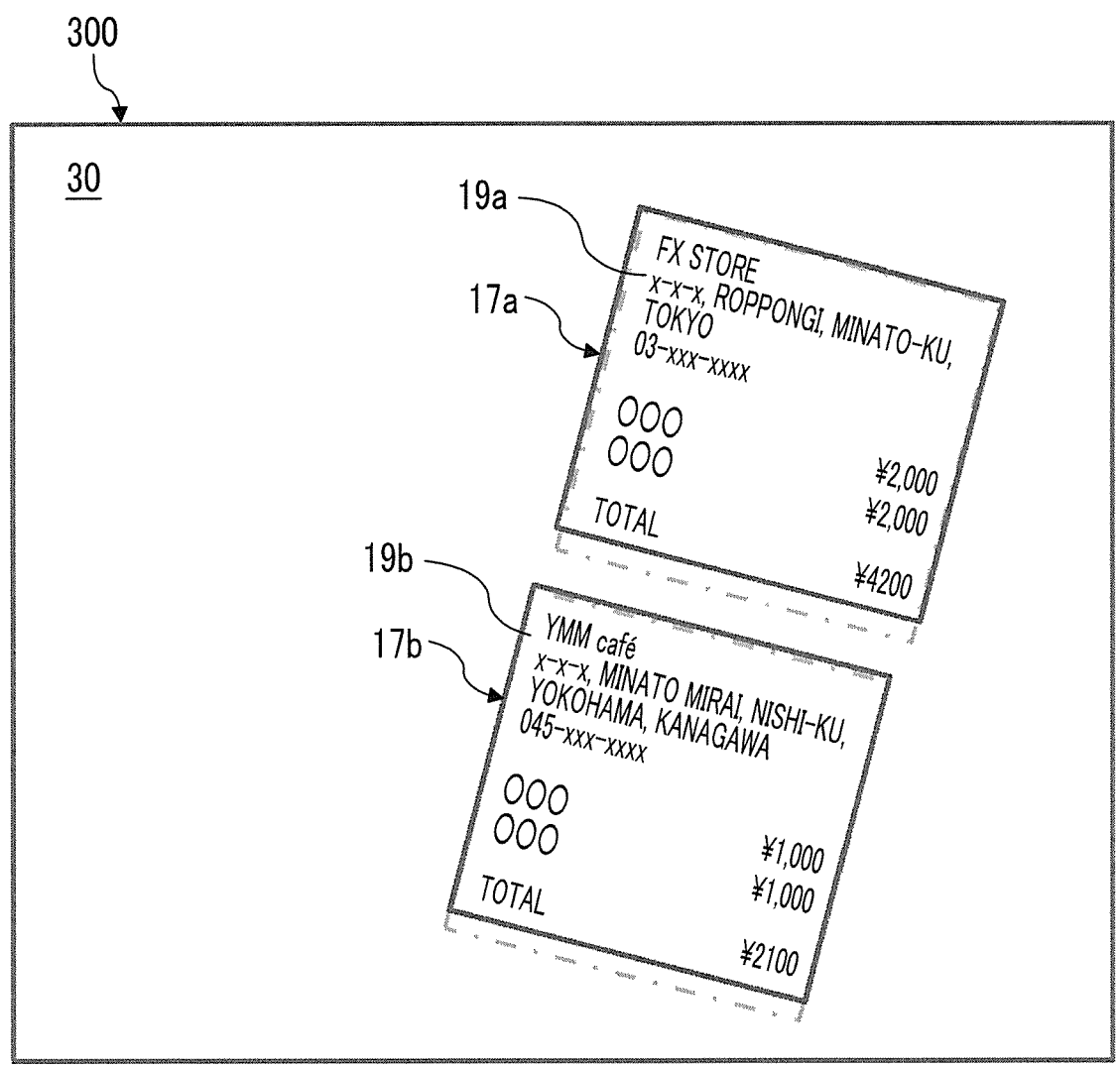
FIG. 21 is a diagram illustrating another example of the estimation result screen for displaying the main estimation result.

Thus, corresponding document images 19a and 19b are displayed within the document region images 17a and 17b within the estimation result screen 300 illustrated in FIG. 20 on the estimation result screen 300 illustrated in FIG. 21, respectively. In this example, the document images 19a and 19b are aligned with the corresponding document region images 17a and 17b by rotating the images within the document regions 14a and 14b within the scan image 10 on the same plane such that the user can intuitively recognize. Although the image obtained by superimposing the frame lines of the document region images 17a and 17b on the image obtained by converting the scan image 10 into the mirror image (that is, turning the scan image inside out) may be displayed on the estimation result screen, the estimation result screen illustrated in FIG. 21 is easier for the user to intuitively recognize which region corresponds to which document.

The configuration and the processing according to the exemplary embodiment have been described above. However, the examples of the configuration and processing described above are merely illustrative. Various modifications and improvements can be made within the scope of the present invention. For example, it has been described in the example of the processing described above that the processing proceeds from the upper end to the lower end of the document region of the provisional estimation result, the processing may proceed from the lower end to the upper end.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
receive an input image including images of a plurality of documents;
execute a provisional estimation of a region of each document of the plurality of documents included in the input image;
execute a detection of one or more items determined in advance as an item included in the document from the input image; and
execute output processing of extracting and outputting the image of each document of the plurality of documents from the input image based on the detected one or more items, wherein
the one or more items is determined in advance as the item included in the document include a plurality of items,
in the output processing, an image of a continuous region including all the plurality of items in the input image is extracted and output as one document image, and
the detection and the output processing are executed for a partial image of the region of each document of the plurality of documents obtained by the provisional estimation.

2. The information processing apparatus according to claim 1,
wherein, in the output processing, the partial image is extracted and output as the one document image for each continuous portion including all the plurality of items in order from one end to the other end of each region for each region obtained by the provisional estimation.

3. The information processing apparatus according to claim 2,
wherein the processor is configured to acquire kind information indicating a kind of the document included in the input image, and
in the detection, the one or more items determined in advance in association with the kind indicated by the acquired kind information are detected from the input image.

4. The information processing apparatus according to claim 3,
wherein the processor is configured to accept selection of the one or more items from a user for each kind of the document.

5. The information processing apparatus according to claim 1, wherein, in a case where a plurality of patterns of the region is obtained by the provisional estimation,
in the output processing, a partial image divided according to a boundary between the regions in a pattern that is not adopted among the plurality of patterns is extracted and output as one document image, the partial image being a continuous portion including the plurality of items within each region for each region belonging to one pattern adopted among the plurality of patterns.

6. The information processing apparatus according to claim 5,
wherein the processor is configured to acquire kind information indicating a kind of the document included in the input image, and
in the detection, the one or more items determined in advance in association with the kind indicated by the acquired kind information are detected from the input image.

7. The information processing apparatus according to claim 6,
wherein the processor is configured to accept selection of the one or more items from a user for each kind of the document.

8. The information processing apparatus according to claim 1,
wherein the processor is configured to acquire kind information indicating a kind of the document included in the input image, and
in the detection, the one or more items determined in advance in association with the kind indicated by the acquired kind info nation are detected from the input image.

9. The information processing apparatus according to claim 8,
wherein the processor is configured to accept selection of the one or more items from a user for each kind of the document.

10. The information processing apparatus according to claim 1, wherein the processor is configured to acquire kind information indicating a kind of the document included in the input image, and
in the detection, the one or more items determined in advance in association with the kind indicated by the acquired kind information are detected from the input image.

11. The information processing apparatus according to claim 10,
wherein the processor is configured to accept selection of the one or more items from a user for each kind of the document.

12. The information processing apparatus according to claim 1, wherein the processor is configured to acquire kind information indicating a kind of the document included in the input image, and
in the detection, the one or more items determined in advance in association with the kind indicated by the acquired kind information are detected from the input image.

13. The information processing apparatus according to claim 12,
wherein the processor is configured to accept selection of the one or more items from a user for each kind of the document.

14. A non-transitory computer readable medium storing a program for operating a computer to execute a process, the process comprising:
receiving an input image including images of a plurality of documents;
executing a provisional estimation of a region of each document of the plurality of documents included in the input image;
executing a detection of one or more items determined in advance as an item included in the document from the input image; and
executing output processing of extracting and outputting the image of each document of the plurality of documents from the input image based on the detected one or more images, wherein
the one or more items is determined in advance as the item included in the document include a plurality of items, in the output processing, an image of a continuous region including all the plurality of items in the input image is extracted and output as one document image, and the detection and the output processing are executed for a partial image of the region of each document of the plurality of documents obtained by the provisional estimation.

\* \* \* \* \*